United States Patent
Umehara et al.

(10) Patent No.: US 6,565,975 B2
(45) Date of Patent: May 20, 2003

(54) MULTILAYERED RESIN PLATE AND PROCESS FOR PRODUCING THE SAME

(75) Inventors: Toshiyuki Umehara, Osaka (JP); Yoshimasa Sakata, Osaka (KP)

(73) Assignee: Nitto Denko Corporation, Osaka (JP)

( * ) Notice: Subject to any disclaimer, the term of this patent is extended or adjusted under 35 U.S.C. 154(b) by 104 days.

(21) Appl. No.: 09/736,179

(22) Filed: Dec. 15, 2000

(65) Prior Publication Data

US 2001/0053425 A1 Dec. 20, 2001

(30) Foreign Application Priority Data

Dec. 15, 1999 (JP) .......................................... 11-355586

(51) Int. Cl.$^7$ .............................................. B32B 27/38
(52) U.S. Cl. ...................... 428/413; 156/230; 156/231; 427/407.1; 427/412.1; 428/172; 428/220
(58) Field of Search ................................ 428/1.53, 172, 428/220, 413, 414; 156/230, 231; 427/407.1, 412.1

(56) References Cited

U.S. PATENT DOCUMENTS

| 2,268,622 A | 1/1942 | Rooney et al. |
| 4,374,890 A | 2/1983 | Shimizu et al. |
| 4,563,395 A | 1/1986 | Gillner et al. |
| 5,540,875 A | 7/1996 | Rubio |
| 5,560,959 A | 10/1996 | Shimoda et al. |

FOREIGN PATENT DOCUMENTS

| DE | 19920319 | * 12/1999 |
| JP | A-11-333866 | 12/1999 |
| JP | A-11-333869 | 12/1999 |
| JP | A-11-333872 | 12/1999 |
| JP | A-2000-81514 | 3/2000 |
| JP | A-2000-105305 | 4/2000 |
| JP | A-2000-158465 | 6/2000 |
| JP | A-2000-225625 | 8/2000 |
| JP | A-2000-225626 | 8/2000 |
| JP | A-2000-227516 | 8/2000 |
| JP | A-2000-231095 | 8/2000 |

OTHER PUBLICATIONS

European Search Report dated Apr. 22, 2002.

* cited by examiner

*Primary Examiner*—Robert Dawson
*Assistant Examiner*—D. Aylward
(74) *Attorney, Agent, or Firm*—Sughure Mion, PLLC

(57) ABSTRACT

A cured resin plate which is reduced in undulation and has excellent flatness even when having a thickness of 100 $\mu$m or larger or a size exceeding 2 inches; and a process for efficiently mass-producing the resin plate. The process comprises spreading a resinous coating fluid A on a support (5) having a smooth surface to form an unsolidified or solidified coating layer, spreading thereon a resinous coating fluid B which is the same as or different from the coating fluid A to form two or more superposed layers of the coating fluid B, and solidifying the layers (12, 22, and 42) separately or simultaneously to thereby form superposed resin layers (1, 2, and 4) adhered to each other which comprise two or more adjacent cured resin layers (1 and 2). The multilayered resin plate comprises superposed layers adhered to each other which are composed of a thermoset epoxy resin layer and superposed thereon a thermoset epoxy resin layer having a smaller thickness than that layer. The multilayered resin plate can be continuously produced by the process in which resinous coating fluids are spread. The resin plate can be reduced in undulation because it comprises cured resin layers superposed on each other.

7 Claims, 1 Drawing Sheet

MULTILAYERED RESIN PLATE AND PROCESS FOR PRODUCING THE SAME

FIELD OF THE INVENTION

The present invention relates to a multilayered resin plate of the cured-layer superposition type which has excellent flatness and is suitable for use in, e.g., optical applications such as cell substrates, touch panels, electromagnetic shields, and solar cell covers. The invention further relates to a process for producing the resin plate.

DESCRIPTION OF THE RELATED ART

With the trend toward size increase in liquid-crystal displays, cell substrates are required to be thinner and more lightweight. Under these circumstances, there is a desire for a resin substrate usable as a substitute for glass substrates, and thermoset epoxy resin plates excellent in heat resistance and optical properties are expected to be promising. This is because the thermoplastic resin films used as cell substrates in portable telephones and the like are so insufficient in rigidity that it is difficult to maintain a cell gap and to obtain a liquid-crystal cell having a size of 2 inches or larger.

However, the conventional thermoset epoxy resin plates produced through casting or the like not only are unsuitable for mass production but have a problem that the resin plates obtained are apt to have an undulation due to internal strain resulting from, e.g., time differences in thermal curing and hence have poor flatness. Such undulation becomes severer as the thickness of the resin plates increases especially in the range of thicknesses not smaller than 100 $\mu$m, which is required of cell substrates and the like, and as the substrate size increases. This undulation has been a serious obstacle to the use of those thermoset epoxy resin plates in applications such as cell substrates.

SUMMARY OF THE INVENTION

An object of the invention is to provide a cured resin plate which is reduced in undulation and has excellent flatness even when having a thickness of 100 $\mu$m or larger or a size exceeding 2 inches. Another object of the invention is to provide a process for efficiently mass-producing the resin plate.

The invention provides a process for producing a multilayered resin plate which comprises spreading a resinous coating fluid A on a support having a smooth surface to form an unsolidified or solidified coating layer, spreading thereon a resinous coating fluid B which is the same as or different from the coating fluid A to form two or more superposed layers of the coating fluid B, and solidifying the layers separately or simultaneously to thereby form superposed resin layers adhered to each other which comprise two or more adjacent cured resin layers. The invention further provides a multilayered resin plate comprising superposed layers adhered to each other which are composed of a thermoset epoxy resin layer and superposed thereon a thermoset epoxy resin layer having a smaller thickness than that layer.

According to the invention, a multilayered resin plate can be continuously mass-produced highly efficiently by the process in which resinous coating fluids are spread. Since the cured resin plate obtained comprises cured resin layers superposed on each other, it can be reduced in undulation and has excellent flatness even when having a thickness as large as 100 $\mu$m or more or having a large area with a size exceeding 2 inches.

Description of Reference Numerals

Figure 1:
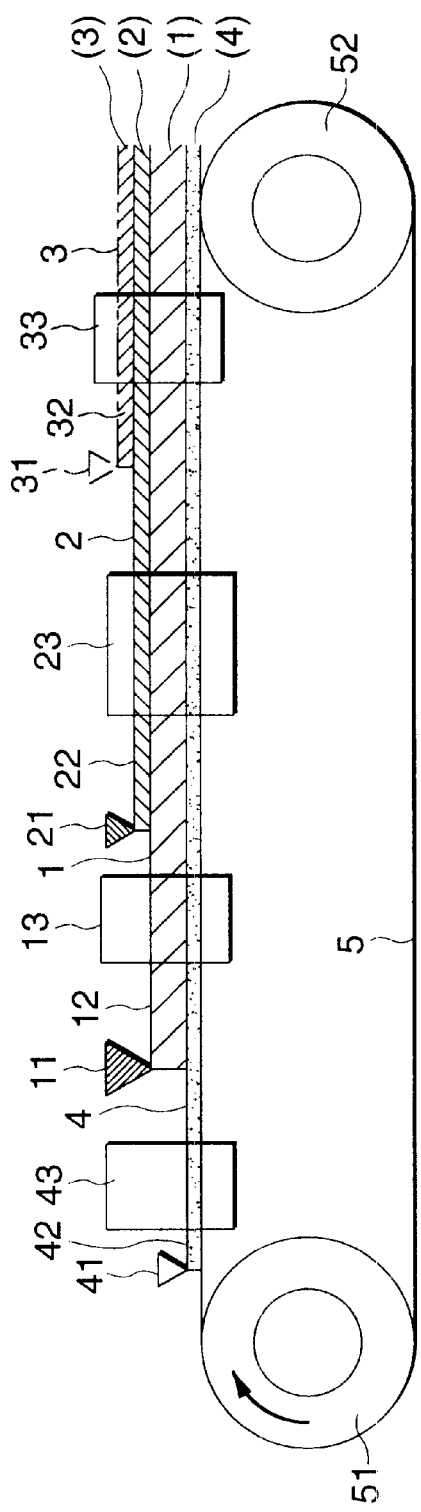
FIG. 1 is a sectional view illustrating an embodiment of the production process.

1, 2: adjacent cured resin layers
4: resin layer
5: support
12, 22, 32, 42: coating layer

DETAILED DESCRIPTION OF THE INVENTION

The process of the invention comprises spreading a resinous coating fluid A on a support having a smooth surface to form an unsolidified or solidified coating layer, spreading thereon a resinous coating fluid B which is the same as or different from the coating fluid A to form two or more superposed layers of the coating fluid B, and solidifying the layers separately or simultaneously to thereby form superposed resin layers adhered to each other which comprise two or more adjacent cured resin layers. Thus, a multilayered resin plate is obtained.

For carrying out the process described above, a suitable technique capable of spreading the resinous coating fluids into a sheet form can be used. Examples thereof include roll coating, wire-wound-bar coating, extrusion coating, curtain coating, spray coating, and doctor blade coating. Especially preferred from the standpoints of coating efficiency, production efficiency, etc. are flow casting techniques, in particular, extrusion coating in which a resinous coating fluid is spread with a die.

FIG. 1 illustrates an example of a continuous production process by the extrusion coating technique. In this method, a support consisting of an endless belt 5 having a smooth surface is first caused to run in the direction indicated by the arrow by means of a driving drum 51 and a subsidiary drum 52 at a constant speed of, e.g, from 0.1 to 50 m/min, preferably from 0.2 to 5 m/min. While the support 5 is thus kept running, a coating fluid comprising a strippable resin is continuously applied in a sheet form on the support 5 through a die 41. The resultant spread layer 42 is dried or is cured according to need by heating, light irradiation, etc. to obtain a resin layer 4 consisting of a film. In the example shown in the FIGURE, an ultraviolet irradiator 43 is disposed.

While the resin layer 4 is continuously formed on the support in that manner, a coating fluid comprising a curable resin is continuously applied on the resin layer and spread into a sheet form through a die 11. This spread layer 12 is cured according to need. Thereafter, a coating fluid comprising a curable resin is continuously applied thereon and spread into a sheet form through a die 21 to form a spread layer 22 superposed on the spread layer 12. These superposed spread layers 12 and 22 may be simultaneously cured (23) when these layers comprise the same type of curable resin, e.g., thermosetting resin. Alternatively, these layers may be cured separately (13 and 23).

By the method described above, a multilayered resin plate comprising superposed resin layers 4, 1, and 2 adhered to each other can be continuously produced through a series of simple operations. This process is highly suitable for mass production. The resin layer 4, which is the first layer formed on the substrate 5, enables the multilayered resin plate obtained to be stripped and recovered as a united structure from the support. Furthermore, by regulating the traveling speed of the spread layers deposited on the support, the rate of mass production can be easily controlled. The thickness of the multilayered resin plate to be obtained can also be easily regulated by regulating that traveling speed or the spread rate of each coating fluid.

The support can be an appropriate material on which the resinous coating fluids can be spread successively and continuously and which can support the spread layers while keeping the same in a sheet form. Examples thereof include belts such as endless belts, plates, and drums. The substrate may be made of any material which withstands the treatment for curing the resins. Consequently, appropriate materials may be used, such as metals, e.g., stainless steel, copper, and aluminum, glasses, and plastics. Preferred of these from the standpoints of durability and others is stainless steel.

According to the method described above, the surface state of the support can be satisfactorily transferred and reflected through the resin layer 4. Consequently, by using a support having a smooth surface, a multilayered resin plate having a smooth surface can be obtained. For example, when a support having a surface roughness $R_a$ of 0.02 μm or lower is used, it is possible to obtain a multilayered resin plate having a mirror surface.

For forming the resin layer 4, which is the first layer deposited on the support 5, in the method shown above as an example, it is preferred to use a readily strippable transparent resin which does not bond to the support or which weakly bonds to the support and can be easily stripped therefrom. This transparent resin is not particularly limited in kind. Examples thereof include urethane resins, acrylic resins, polyester resins, poly (vinyl alcohol) resins such as poly(vinyl alcohol) and ethylene/vinyl alcohol copolymers, vinyl chloride resins, and vinylidene chloride resins.

Other transparent resins usable for forming the resin layer include polyarylate resins, sulfone resins, amide resins, imide resins, polyethersulfone resins, polyetherimide resins, polycarbonate resins, silicone resins, fluororesins, polyolefin resins, styrene resins, vinylpyrrolidone resins, cellulosic resins, and acrylonitrile resins. A blend of two or more suitable transparent resins can also be used for forming the resin layer.

The resin layer 4 should be tenaciously adhered to the cured resin layer 1 and be stripped and recovered from the support together with the same to constitute a surface layer of the multilayered resin plate. From this standpoint, the resin layer is preferably one which is excellent in optical properties including transparency. Urethane resins are preferred resins usable for forming the resin layer, from the standpoints of such optical properties, the strippability described above, in particular strippability from a stainless-steel support, suitability for use as a hard coat, etc.

As described above, the resin layer 4 can function as a surface coat layer in the multilayered resin plate. From this standpoint, a material for forming the resin layer 4 may be selected so as to impart functions such as, e.g., chemical resistance, surface hardness or hard coating, optical anisotropy, low water absorption, low hygroscopicity, and gas barrier properties, e.g., low oxygen permeability.

Consequently, the resin layer 4 may be formed so as to have a multilayer structure for the purpose of imparting strippability and one or more other functions or for another purpose. For example, it may be composed of a urethane resin layer for imparting strippability and a resin layer for imparting gas barrier properties which is superposed on the urethane resin layer, i.e., formed between the urethane resin layer and the cured resin layer 1.

The hard coat layer is intended to form a hard surface so as to prevent marring, which may impair visibility. It is therefore preferred to form the hard coat layer from a resin capable of forming a transparent rigid film. For example, appropriate crosslinkable resins shown above as examples of materials for the resin layer 4 are preferred. Especially preferred is an ultraviolet-curable resin, e.g., urethane-acrylic resin, which contains a polyfunctional monomer and has been formulated so as to be three-dimensionally crosslinked by ultraviolet irradiation with the aid of a photocatalyst or the like.

On the other hand, the gas barrier layer is intended to shut off water, oxygen, and other substances which may alter liquid crystals, etc. This layer can be made of an appropriate material which can prevent gas permeation. From the standpoints of durability, deformation resistance, etc., the gas barrier layer is preferably made of a polymer having a low coefficient of oxygen permeability. Examples of such a polymer include poly(vinyl alcohol), partially saponified poly(vinyl alcohol)s, ethylene/vinyl alcohol copolymers, polyacrylonitrile, and poly(vinylidene chloride). Especially preferred are vinyl alcohol polymers from the standpoints of gas barrier properties, evenness of water diffusion or absorption, etc.

The resin layer 4 can be formed, for example, by the following method. A resin is applied to a given surface of a support by an appropriate technique such as any of the aforementioned ones, if desired as a solution in an appropriate solvent such as an organic solvent or water. The coating is converted to a cured film by suitably curing the coating by, e.g., heating or light irradiation, if desired after drying the coating. Thus, the resin layer 4 is formed. The resin solution can have a suitably determined viscosity. In general, however, the viscosity thereof is regulated to from 1 to 100 cP from the standpoints of coating efficiency, etc.

The thickness of the resin layer 4 to be formed can be suitably determined. However, from the standpoints of strippability, cracking prevention in stripping, etc., the thickness thereof is generally preferably from 1 to 10 μm, more preferably from 1 to 8 μm, most preferably from 2 to 5 μm. In the case of curing a coating layer of, e.g., the urethane resin by light irradiation, it is preferred to use a high-pressure or low-pressure ultraviolet lamp having a central wavelength of 365 nm or 254 nm from the standpoints of curing efficiency, etc.

For preparing a curable resinous coating fluid to be spread on the resin layer 4, a suitable curable resin can be used according to the intended use of the multilayered resin plate, etc. This curable resin is not particularly limited in kind and may be, for example, an unsaturated polyester resin or a silicone resin. However, from the standpoints of heat resistance, optical properties, etc., it is preferred to use a thermosetting epoxy resin.

Examples of the epoxy resin include the bisphenol types such as bisphenol A type, bisphenol F type, bisphenol S type, and hydrogenated epoxies derived from these, the novolak types such as phenol novolak type and cresol novolak type, the nitrogen-containing cyclic types such as triglycidyl isocyanurate type and hydantoin type, the alicyclic type, the aliphatic type, the aromatic type such as naphthalene type, the glycidyl ether type, the low-water-absorption type such as biphenyl type, the dicyclo type, the ester type, the etherester type, and modifications of these.

Preferred epoxy resins from the standpoints of unsusceptibility to discoloration upon curing, optical properties including transparency, etc. are the bisphenol A type, alicyclic type, and triglycidyl isocyanurate type. From the standpoints of properties of the multilayered resin plate, including rigidity and strength, preferred epoxy resins are ones having an epoxy equivalent of from 100 to 1,000 and giving a cured resin having a softening point of 120° C. or lower.

Furthermore, from the standpoints of obtaining an epoxy resin coating fluid excellent in applicability and spreadability into a sheet form, etc., it is preferred to use a two-pack type epoxy resin which is liquid at temperatures not higher than the application temperature, in particular at room temperature. In this case, a solid epoxy resin can be used in combination with that epoxy resin for the purposes of viscosity regulation, improvement of strength or heat resistance, etc. Consequently, epoxy resins can be used alone or in combination of two or more thereof.

A curing agent can be incorporated into the epoxy resin coating fluid according to need. When the epoxy resin coating fluid is a thermosetting one, a curing agent is usually incorporated therein. The curing agent to be used is not particularly limited, and one or more suitable curing agents can be used according to the epoxy resin used. Examples thereof include organic acid compounds such as tetrahydrophthalic acid, methyltetrahydrophthalic acid, hexahydrophthalic acid, and methylhexahydrophthalic acid and amine compounds such as ethylenediamine, propylenediamine, diethylenetriamine, triethylenetetramine, amine adducts of these, m-phenylenediamine, diaminodiphenylmethane, and diaminodiphenyl sulfone.

Other examples of the curing agent include amide compounds such as dicyandiamide and polyamides, hydrazide compounds such as dihydrazide, and imidazole compounds such as methylimidazole, 2-ethyl-4-methylimidazole, ethylimidazole, isopropylimidazole, 2,4-dimethylimidazole, phenylimidazole, undecylimidazole, heptadecylimidazole, and 2-phenyl-4-methylimidazole.

Examples of the curing agent further include imidazoline compounds such as methylimidazoline, 2-ethyl-4-methylimidazoline, ethylimidazoline, isopropylimidazoline, 2,4-dimethylimidazoline, phenylimidazoline, undecylimidazoline, heptadecylimidazoline, and 2-phenyl-4-methylimidazoline, and further include phenol compounds, urea compounds, and polysulfide compounds.

Acid anhydride compounds also are included in examples of the curing agent. Such acid anhydride curing agents can be advantageously used from the standpoints of attaining a satisfactory working atmosphere due to their lowly irritating properties and obtaining a multilayered resin plate which has improved heat resistance and hence has high-temperature durability and discoloration resistance. Examples thereof include phthalic anhydride, maleic anhydride, trimellitic anhydride, pyromellitic anhydride, nadic anhydride, glutaric anhydride, tetrahydrophthalic anhydride, methyltetrahydrophthalic anhydride, hexahydrophthalic anhydride, methylhexahydrophthalic anhydride, methylnadic anhydride, dodecenylsuccinic anhydride, dichlorosuccinic anhydride, benzophenonetetracarboxylic anhydride, and chlorendic anhydride.

Especially preferred from the standpoints of the discoloration resistance, etc. are acid anhydride curing agents which are colorless to light-yellow and have a molecular weight of about from 140 to 200, such as phthalic anhydride, tetrahydrophthalic anhydride, hexahydrophthalic anhydride, and methylhexahydrophthalic anhydride.

The amount of the curing agent to be used can be suitably determined according to the kind thereof, the epoxy equivalent of the epoxy resin, etc., and may be the same as in the usual curing of epoxy resins. It is generally preferred to use the curing agent in an amount of from 0.5 to 1.5 equivalents, preferably from 0.6 to 1.4 equivalents, more preferably from 0.7 to 1.2 equivalents, per equivalent of the epoxy groups from the standpoint of obtaining a multilayered resin plate which is prevented from deteriorating in hue or moisture resistance.

In the process described above as an example, the multilayered resin plate formed is recovered from the support preferably by stripping the resin plate in an atmosphere having a high temperature around the glass transition temperature. This method is preferred from the standpoints of cracking prevention, etc. In particular, from the standpoint of attaining balanced flexibility capable of preventing cracking, plastic deformation, and generation of residual strain, it is preferred to strip the resin plate at a temperature not lower than the temperature lower by 20° C. than the glass transition temperature of the cured resin layers. Consequently, from the aforementioned standpoints of preventing cracking, strain, etc., the multilayered resin plate is preferably recovered after the curable resin has heat-cured to such a degree as not to suffer a plastic deformation even at high temperatures around the glass transition temperature.

A means for stripping can be used according to need in recovering the multilayered resin plate from the support in the process described above. For example, after the formation of the resin layer 4, a heat-resistant tape is bonded, e.g., to each edge of the layer. Cured resin layers are formed thereon, and the heat-resistant tape is then held and lifted up to thereby efficiently strip and recover the multilayered resin plate from the support. The continuous multilayered resin plate thus formed can be recovered after having been cut into an appropriate size by an appropriate means for cutting, e.g., a laser beam, ultrasonic cutter, dicing, or water jet.

As described above, in the process of the invention, a multilayered resin plate is formed by spreading a resinous coating fluid A on a support having a smooth surface to form an unsolidified or solidified coating layer, spreading thereon a resinous coating fluid B which is the same as or different from the coating fluid A to form two or more superposed layers of the coating fluid B, and solidifying the layers separately or simultaneously to thereby form superposed resin layers adhered to each other which comprise two or more adjacent cured resin layers.

The example of this process described above can be modified in the following manner. In place of forming the resin layer 4 on a support, a resin film or the like formed beforehand is used as a support. This support is placed on a supporting table and curable resinous coating fluids are spread thereon. In this method also, a resin plate composed of superposed resin layers which include the resin film or the like and are adhered to each other can be continuously formed and, simultaneously therewith, this resin plate can be easily peeled from the supporting table. Thus, a multilayered resin plate having adjacent cured resin layers can be efficiently obtained. As the resin film or the like, an appropriate film or sheet can be used, such as an optical film having a function suitable for the intended use of the multilayered resin plate.

The resinous coating fluids can be prepared by bringing the ingredients into a flowable and spreadable state using a solvent if necessary. Suitable additives such as, e.g., a curing accelerator and a leveling agent can be incorporated according to need in preparing the curable resinous coating fluids. A curing accelerator is incorporated for the purpose of heightening the rate of curing and thereby reducing the curing time required. By the incorporation thereof, the length of the support necessary for the coating fluid containing no curing accelerator can be reduced to about a half or smaller. It is therefore preferred to incorporate a curing accelerator from the standpoints of improvement in suitability for mass production, size reduction in the apparatus for continuous production, etc.

The curing accelerator to be used is not particularly limited, and one or more suitable curing accelerators can be used according to the kinds of the curable resin, e.g., epoxy, and of the curing agent, etc. Examples thereof include tertiary amines, imidazole compounds, quaternary ammonium salts, organic metal salts, phosphorus compounds, and urea compounds. The amount of the curing accelerator to be used can be suitably determined according to its acceleration effect, etc. In general, however, the amount thereof is from 0.05 to 7 parts by weight, preferably from 0.1 to 5 parts by weight, more preferably from 0.2 to 3 parts by weight, per 100 parts by weight of the curable resin.

On the other hand, a leveling agent is incorporated for the purpose of, e.g., forming a smooth surface by preventing a spread layer of each curable resinous coating fluid from giving a satin surface due to unevenness of surface tension resulting from the vaporization of the curing agent, etc. when the spread layer is cured in an air atmosphere. One or more suitable leveling agents capable of reducing surface tension can be used. Examples thereof include various surfactants such as silicone, acrylic, and fluorochemical surfactants.

Examples of other additives which can be incorporated include antioxidants such as phenol compounds, amine compounds, organosulfur compounds, and phosphine compounds, modifiers such as glycols, silicones, and alcohols, antifoamers, hydroxy compounds, dyes, discoloration inhibitors, ultraviolet absorbers, and light-diffusing agents. The antifoamers are added for the purpose of, e.g., obtaining a multilayered resin plate which has no bubbles causative of a decrease in optical properties. Preferred examples of the antifoamers are polyhydric alcohols such as glycerol.

The curable resinous coating fluids each can have a suitably determined viscosity. However, a desirable method is to spread on an unsolidified or solidified coating layer a curable resinous coating fluid having a lower viscosity than the curable resinous coating fluid used for forming the unsolidified or solidified coating layer to thereby form adjacent cured resin layers 1, 2, . . . as shown in the FIGURE. This method is preferred from the standpoints of coating efficiency and of attaining both improved thickness precision brought about by diminished thickness unevenness, etc. and improved flatness brought about by diminished undulation.

An especially preferred method is to first spread a curable resinous coating fluid having a viscosity at 25° C. of 30 P or higher, preferably from 35 to 350 P, more preferably from 40 to 300 P, and then spread, on the resultant unsolidified or solidified coating layer, a curable resinous coating fluid having a viscosity at 25° C. of 2 P or lower, preferably from 0.1 to 1.5 P, more preferably from 0.5 to 1.2 P. In this method, the coating fluid having a higher viscosity, which is spread first, can give a cured resin layer which accounts for at least ½, preferably at least ⅗, more preferably at least ⁷⁄₁₀, of the total thickness of the adjacent cured resin layers, and both the improved thickness precision and the improved flatness can be advantageously attained. Thus, the target multilayered resin plate can be efficiently produced.

The thickness of the adjacent cured resin layers to be formed can be suitably determined according to the intended use of the multilayered resin plate, etc. In general, however, the total thickness thereof is regulated to 1 mm or smaller, preferably from 100 to 800 μm, more preferably from 150 to 500 μm, from the standpoints of rigidity or flexibility, including flexural strength, and of retardation reduction and thickness and weight reduction.

For the heat curing of the spread layer of each thermosetting resinous coating fluid, one or more suitable heating means can be used, such as hot air and an infrared heater. Through the curing treatment, the resin layers usually adhere satisfactorily to each other to give cured resin layers which can be handled as a united structure. Thus, superposed cured resin layers excellent in adhesion and heat resistance can be obtained.

In the case of a thermosetting epoxy resin, heating conditions generally include a heating temperature of from 30 to 250° C., preferably from 45 to 220° C., more preferably from 50 to 200° C., and a heating time of from 5 minutes to 5 hours, preferably from 30 minutes to 4 hours, more preferably from 1 to 3 hours. However, the heating conditions should not be construed as being limited to these. From the standpoint of improving thickness precision, it is preferred to maintain the support, on which the spread layer of each resinous coating fluid is to be supported, as horizontal as possible and to minimize temperature fluctuations in the spread layer in the width direction.

As shown in the FIGURE, the multilayered resin plate produced by the process of the invention comprises two or more superposed resin layers adhered to each other which comprise at least two cured resin layers 1 and 2 adjacent to each other. This resin plate is reduced in undulation, is lightweight and excellent in flatness and other properties, and can be advantageously used in various applications.

Furthermore, a multilayered resin plate excellent also in heat resistance, optical properties, flexural strength, surface smoothness, etc. and reduced in retardation can be easily obtained by the process. This multilayered resin plate can be advantageously used in optical applications such as, e.g., the cell substrates of various cells including liquid-crystal cells, touch panels, electromagnetic shields, and solar cell covers, especially in applications where resistance to high temperatures is required.

For use in applications where satisfactory heat resistance is especially required, e.g., as a liquid-crystal cell substrate which should withstand a high-temperature atmosphere during liquid-crystal cell production, a preferred multilayered resin plate is one which comprises at least two superposed layers adhered to each other composed of a thermoset epoxy resin layer and superposed thereon a thermoset epoxy resin layer having a smaller thickness than that layer. Especially preferred is a multilayered resin plate having a cured resin layer having a glass transition temperature of 170° C. or higher, preferably 180° C. or higher.

From the standpoint of enabling the liquid-crystal cell to have satisfactory optical properties by preventing the coloration caused by birefringence, the thickness precision of the multilayered resin plate is preferably within ±20%, more preferably within ±15%, most preferably within ±10%, and the retardation thereof is preferably 30 nm or smaller, more preferably 15 nm or smaller, most preferably 5 nm or smaller. The glass transition temperature of a cured resin layer can be determined by TMA (thermomechanical analysis) in the tensile mode under the conditions of a heating rate of 2° C./min.

A light-diffusing agent can be incorporated in any of the thermoset epoxy resin layers to thereby give a multilayered resin plate having light-diffusing properties. This multilayered resin plate can be disposed as a light-diffusing layer near a liquid-crystal layer to attain an improvement in dispersing effect. The thermoset epoxy resin layer containing a light-diffusing agent can be formed, e.g., by adding a light-diffusing agent to the resinous coating fluid. One or more of the thermoset epoxy resin layers may contain a light-diffusing agent.

As the light-diffusing agent can be used one or more kinds of appropriate transparent particles having an average particle diameter of from 0.5 to 20 μm. Examples thereof include inorganic particles which may be electroconductive, such as silica, alumina, titania, zirconia, tin oxide, indium oxide, cadmium oxide, and antimony oxide particles, and organic particles made of a crosslinked or uncrosslinked polymer. The light-diffusing agent may be used in an amount of generally from 2 to 50 parts by weight, preferably from 5 to 25 parts by weight, per 100 parts by weight of the resin.

The multilayered resin plate according to the invention may have one or more appropriate resin layers such as, e.g., a hard coat layer and a gas barrier layer as described above. In this case, such resin layers may be located only on one side of the adjacent cured resin layers or located on both sides thereof as shown in the FIGURE. An appropriate layer which is not a resin layer may be disposed on the adjacent cured resin layers.

In this connection, in the process shown in the FIGURE, a coating fluid 32 containing a metal alkoxide is continuously applied on the cured resin layer 2 and spread into a sheet form through a die 31, and this spread layer is introduced into a heater 33 and heated therein to hydrolyze and condensation-polymerize the metal alkoxide. Thus, a multilayered resin plate having a transparent inorganic oxide layer 3 adhered to the cured resin layer 2 is continuously obtained. This transparent inorganic oxide layer 3 is intended, for example, to improve the adhesion of a transparent conductive film to be deposited thereon.

For practical use of the multilayered resin plate according to the invention in fabricating a liquid-crystal cell or the like, various functional layers may be superposed thereon, such as, e.g., a transparent conductive film, polarizing film, and retardation film. The transparent conductive film can be deposited by a conventional suitable technique if desired through the transparent inorganic oxide layer described above. For example, use may be made of a method in which tin oxide, indium oxide, ITO, i.e., indium-tin mixed oxide, gold, platinum, palladium, or the like is deposited by a vacuum deposition technique such as sputtering, or a method in which a coating composition for forming a transparent conductive film is applied.

An alignment film, which is optionally formed for liquid-crystal alignment, can be deposited by a suitable conventional technique on the transparent conductive film or on a transparent electrode pattern formed therefrom. The liquid-crystal cell to be formed may employ any desired liquid crystal, e.g., of the TN type, STN type, TFT type, or ferroelectric type.

The invention will be explained below in more detail by reference to the following Examples, but the invention should not be construed as being limited thereto.

EXAMPLE 1

Using the flow casting method shown in the FIGURE, multilayered resin plates were produced in the following manner. A 17 wt % toluene solution of an ultraviolet-curable urethane resin (NK Oligo UN-01, manufactured by Shin-Nakamura Chemical Co., Ltd.) was extruded through a die and applied to a stainless-steel endless belt which had a mirror surface and was kept running at a constant speed of 0.2 m/min. The toluene was vaporized to dry the coating. The resultant coating layer was cured with an ultraviolet irradiator (central wavelength, 254 nm; integrated dose, 2,000 mJ/cm$^2$) to form a urethane resin layer having a width of 500 mm and a thickness of 2 μm. Thereafter, an aqueous poly(vinyl alcohol) solution was extruded through a die in the same manner and applied on the urethane resin layer, and this coating layer was dried to form a gas barrier layer having a thickness of 3 μm.

While continuing the operations described above, a thermosetting epoxy resin coating fluid having a viscosity of 50 P (as measured at 25° C.; the same applies hereinafter) was continuously extruded through a die and spread into a sheet form on the gas barrier layer to form a spread layer A1 having a thickness of 300 μm. Subsequently, a thermosetting epoxy resin coating fluid having a viscosity of 1 P was continuously extruded through a die and spread into a sheet form on the layer A1 to form a spread layer B1 having a thickness of 100 μm.

The thermosetting epoxy resin coating fluids A1 and B1 each was one prepared by mixing 100 parts (parts by weight; the same applies hereinafter) of 3,4-epoxycyclohexylmethyl 3,4-epoxycyclohexanecarboxylate with 125 parts of methylhexahydrophthalic anhydride, 3.75 parts of tetra-n-butylphosphonium O,O-diethyl phosphorodithioate, 2.25 parts of glycerol, and 0.07 parts of a silicone surfactant, stirring the mixture, and aging it at 49° C. for 90 minutes. The viscosity of each coating fluid was regulated by changing the addition amount of a solvent.

Subsequently, the superposed spread layers A1 and B1 were introduced into a heating oven and heated therein at 60 to 180° C. for 2 hours to cure them. Thus, adjacent cured resin layers composed of superposed thermoset epoxy resin layers A1 and B1 adhered to each other were obtained. These cured resin layers were stripped and recovered over the subsidiary drum kept at 150° C. from the endless belt together with the urethane resin layer adhered to the cured resin layer A1 through the gas barrier layer. The multilayer structure separated from the endless belt was cut at an interval of 490 mm in the machine direction. Thus, multilayered resin plates having a width of 490 mm were continuously obtained.

EXAMPLE 2

Multilayered resin plates were continuously obtained in the same manner as in Example 1, except that a thermosetting epoxy resin coating fluid having a viscosity of 150 P was used to form a spread layer A2 having a thickness of 200 μm and a thermosetting epoxy resin coating fluid containing 1–10 wt % silica particles and having a viscosity of 1.5 P was used to form a 100 μm-thick spread layer B2 superposed on the spread layer A2.

COMPARATIVE EXAMPLE 1

Multilayered resin plates were continuously obtained in the same manner as in Example 1, except that the epoxy resin coating fluid B1 was not applied and the epoxy resin coating fluid A1 was spread in a thickness of 400 μm.

COMPARATIVE EXAMPLE 2

Multilayered resin plates were continuously obtained in the same manner as in Example 2, except that the epoxy resin coating fluid B2 was not applied and the epoxy resin coating fluid A2 was spread in a thickness of 300 μm.

Evaluation Test

The multilayered resin plates obtained in the Examples and Comparative Examples were examined for thickness precision, surface roughness ($R_a$), and undulation (flatness). The results obtained are shown in the following table.

|  | Example 1 | Comparative Example 1 | Example 2 | Comparative Example 2 |
|---|---|---|---|---|
| Thickness precision (μm) | 405 ± 20 | 405 ± 20 | 305 ± 15 | 305 ± 15 |
| $R_a$ (nm) | 0.2 | 0.2 | 0.2 | 0.2 |
| Undulation (nm/20 mm) | 40 | 200 | 45 | 150 |

In view of the fact that polished glass plates generally have an $R_a$ of about 0.8 nm and an undulation of about 40 nm/20 mm, the table shows that the multilayered resin plates obtained in Examples 1 and 2 had a higher surface smoothness ($R_a$) than the polished glass plates and were comparable in flatness (diminution of undulation) to the polished glass plates. The results further show that these multilayered resin plates were excellent also in thickness precision. The multilayered resin plates obtained in Example 2 had hazes ranging from 40 to 90 and showed a satisfactory light-diffusing effect, because of the silica particles contained therein (1–10 wt %).

What is claimed is:

1. A process for producing a multilayered resin plate which comprises spreading a resinous coating fluid A on a support having a smooth surface to form an unsolidified or solidified coating layer, spreading thereon a resinous coating fluid B which is the same as or different from the coating fluid A to form two or more superposed layers of the coating fluid B, and solidifying the layers separately or simultaneously to thereby form superposed resin layers adhered to each other which comprise two or more adjacent cured resin layers.

2. The process of claim 1, wherein the adjacent cured resin layers are ones formed from superposed layers formed by spreading on an unsolidified or solidified coating layer a resinous coating fluid having a lower viscosity than the resinous coating fluid used for forming the unsolidified or solidified coating layer.

3. The process of claim 2, wherein the resinous coating fluids used have viscosities as measured at 25° C. of 30 P or higher and 2 P or lower, respectively.

4. The process of any one of claims 1 to 3, wherein the adjacent cured resin layers each is constituted of a thermoset resin and have a total thickness of from 100 to 500 μm.

5. A multilayered resin plate comprising superposed layers adhered to each other which are composed of a thermoset epoxy resin layer and superposed thereon a thermoset epoxy resin layer having a smaller thickness than that layer.

6. The multilayered resin plate of claim 5, wherein at least one of the thermoset epoxy resin layers contains a light-diffusing agent.

7. The multilayered resin plate of claim 5 or 6, which has at least one of a hard coat layer and a gas barrier layer.

* * * * *